United States Patent

[11] 3,548,075

| [72] | Inventor | Vittorio Buroni |
| | | Milan, Italy |
| [21] | Appl. No. | 734,015 |
| [22] | Filed | June 3, 1968 |
| [45] | Patented | Dec. 15, 1970 |
| [73] | Assignee | Pirelli Societa per Azioni |
| | | Milan, Italy |
| | | a corporation of Italy |
| [32] | Priority | July 20, 1967 |
| [33] | | Italy |
| [31] | | No. 18604A/67 |

[54] SEALING ENDS OF OIL-FILLED ELECTRIC CABLES
18 Claims, 3 Drawing Figs.

| [52] | U.S. Cl. | 174/20 |
| [51] | Int. Cl. | H02g 15/24 |
| [50] | Field of Search | 174/19, 20, 21, 22, 23, 73, 75; 138/89 |

[56] References Cited
UNITED STATES PATENTS

| 1,888,075 | 11/1932 | Eby | 174/20 |
| 2,392,748 | 1/1946 | Lee | 174/22 |
| 2,859,271 | 11/1958 | Johnston et al. | 174/73X |
| 3,331,910 | 7/1967 | Grimmer et al. | 174/31X |

FOREIGN PATENTS

| 167,186 | 6/1954 | Australia | 174/73 |
| 439,575 | 12/1935 | Great Britain | 174/19 |
| 1,085,579 | 7/1960 | Germany | 174/31 |

Primary Examiner—Lewis H. Myers
Assistant Examiner—A. T. Grimley
Attorney—Ward, McElhannon, Brooks & Fitzpatrick ABSTRACT: Cooling sealed ends and joints of electrical cables having a conductor with an oil conduit defined therein and a surface opening communicating with the oil conduit by providing tubing constructed to define an oil channel between the surface opening and an oil reservoir.

INVENTOR.
VITTORIO BURONI

INVENTOR.
VITTORIO BURONI
BY
Ward, McElhannon, Brooks Fitzpatrick
ATTORNEYS

SEALING ENDS OF OIL-FILLED ELECTRIC CABLES

The present invention relates to sealed ends of oil-filled electric cables and, in particular, to sealed ends of electric cables having a conductor with an internal oil conduit which provides oil circulation through the electric cable.

It has been proposed to utilize the oil circulation in oil conduits of electric cables of the class described in order to eliminate overheating in certain localized critical points (i.e. sealed ends and joints) along the electric cable length. This oil circulation may be unidirectional, and in this case the oil is returned in a path external to the electric cable, or the oil circulation can alternate directions in the internal conduit of the electric cable (commonly referred as an alternating circulation system), and in this case suitable variable capacity tanks are provided at the ends of the concerned cable length. The overheating in the mentioned critical points is generally due to the use of thick layers of insulating material which are necessary to insure proper electric insulation at these critical points. The layers of insulating material act as a thermal insulator for the electric cable, and thus prevent at these critical points significant external cooling. It has been found that by circulating oil in the internal oil conduit along the concerned length of electric cable, the temperature along the conductor, and thus the electric cable, is rendered substantially uniform. In fact, if the circulating oil is of a sufficiently cool temperature, the overheating which occurs at these mentioned critical points is substantially reduced and in some instance even eliminated.

In some instances, however, the mere circulation of oil through the conduit provided in the conductor of the electric cable is not sufficient to adequately eliminate overheating at certain critical points. This is especially true for the sealed ends of submerged cables as well as for the sealed ends of open cables which have an outer porcelain insulator cover. In both of these instances, overheating is an especially significant problem since the sealed ends of these electric cables utilize considerably more insulating material than other parts of the electric cable and since it is very difficult to obtain satisfactory cooling from the outside of the outer porcelain insulator.

Another method has been proposed to eliminate overheating of electric cable which is especially useful in eliminating overheating in the sealed ends of electric cable. In accordance with this method, cooled oil is introduced into the cable end accessories making up the sealed ends of the cable. The oil is forced through the accessories to an opening in the conductor of electric cable communicating with the internal oil conduit; and is then returned to an oil reservoir. The cooling action of the introduced oil is effective, however, only for a very short length of electric cable since the rate of oil flow must be purposely maintained very small (in the order of 1 to 2 litres per minute). This aforementioned method is very useful in cooling the sealed ends of electric cable since their overall length is relatively small, but this method is subject, however, to some significant limitations.

If the last-mentioned method of cooling the sealed ends of electric cable is used in conjunction with an alternating oil circulating system, the cooling action attendant the circulating oil is obviously limited to that half period during which the oil passes through the end accessories of the sealed end and into the oil conduit of the conductor. This severely limits the cooling capacity of the circulating oil since the alternating period of oil circulation must be maintained within a specific frequency range in order to maintain the oil temperature in the sealed end within allowable limits during the other half of the circulation period in which the oil present in the end accessories is not renewed.

More significantly, however, and regardless of the method of oil circulation utilized, this last mentioned method of eliminating overheating in the sealed ends of electric cable has been found unsatisfactory since the flow rate of the circulating oil is very small in relation to the volume of the chamber defined by the cable accessories in which the oil must flow. Consequently the oil in the chamber tends to get warm, and thus loses its cooling effect, since it is renewed very slowly.

As an example, the end accessories usually utilized to seal the end of an electric cable include a base plate maintained at ground potential which surrounds the electric cable and which is secured to its outer sheath, and an outer porcelain insulator, which is secured to the base plate and covers the end of the electric cable except for a very small portion of the conductor at the extreme end of the cable. The portion of the electric cable covered by the porcelain insulator usually includes the cable conductor having an oil conduit defined therein and having a surface opening which communicates with this oil conduit. The electric cable enclosed by the outer porcelain insulator also has a thick layer of insulating material which surrounds the conductor except in the vicinity of the surface opening therein communicating with the internal oil conduit. Generally, an opening is provided through the base plate in order to provide a fluid connection between the oil reservoir of the system and the end accessories of the electric cable mentioned above. In operation, oil is forced through the opening in the base plate and into the mentioned end accessories to fill the whole space or chamber between the porcelain insulator and the outer layer of the insulation material wrapped about the conductor. Simultaneously, the oil in this mentioned chamber between the porcelain insulator and the insulating material is continuously drained from the chamber through the surface opening in the conductor and to the internal conduit of the conductor.

As those skilled in the art will appreciate, the volume capacity of the space or chamber defined between the outer porcelain insulator and the outer layer of the insulating material wrapped around the conductor, may be in the range of hundreds of litres. Accordingly since, as aforesaid, the flow rate of oil utilized in oil circulating systems is of the order of 1 to 2 litres per minute, it will be appreciated that the oil which is accumulated in the mentioned space or chamber is very slowly renewed and consequently will tend to become warm. Obviously this limitation reduces the overall effectiveness of this method.

The present invention provides an improved method of and an apparatus for sealing electric cables of the character described which substantially reduces the overheating in the sealed end of electric cables and which eliminates many of the disadvantages found in the above-mentioned prior art methods and apparatus.

In accordance with one aspect of the present invention, there is provided a novel method of and apparatus for producing a sealed end of an oil-filled cable, and of the type cooled by oil circulation. This sealed end includes an end portion of the electrical cable which has a conductor with an oil conduit defined therein and with one or more surface openings communicating with this conduit. The surface openings allow oil passage to the oil conduit or from it. A layer of insulating material is provided around the conductor of the electrical cable in this area except in the vicinity of the openings and at the tip of the electric cable. First means are provided in the end portion of the electrical cable for defining an opening to an oil reservoir of the oil circulation system. Second means are provided for surrounding a part of the end portion of the electric cable including the insulating layer, and for defining a space or oil channel which communicates with the surface openings on the conductor and with the opening to the oil reservoir. Finally, an outer porcelain insulator is provided to surround the end portion of the electric cable including the mentioned second means.

The above-mentioned second means surrounding the end portion of the electric cable and defining a space or oil channel, functions to reduce the volume storage capacity of the circulating oil within the sealing end accessories, and thus enables faster renewal of the oil from the oil reservoir through the end accessories to the openings in the conductor of the electric cable. It has been found that best results are obtained when the ratio between the cross-sectional area of the space or oil channel provided by the second means and the cross-sectional area of the conduit in the conductor of the electric cable is smaller than 50, and is preferably in the range from 10—4.

According to another aspect of the present invention, the second means surrounding the end portion of the electric cable and defining the mentioned space or oil channel is defined in part by hollow cylindrical tubing and is constructed of an insulating material which is impermeable to oil. The cylindrical tubing may be constituted by a plurality of cylindrical tubing of decreasing diameter disposed concentric to the cable end and conforming to its outer shape. The inner surface of the hollow cylindrical tubing defines in cooperation with the insulating layer surrounding the conductor, the mentioned space or oil channel. The inner surface of the cylindrical tubing can be either smooth or provided with grooves which extend longitudinally in a direction along the conductor length. In the latter case, the surfaces of the cylindrical tubing can be in direct contact with the insulating layer of the electric cable since the grooves disposed therein constitute the necessary space or oil channel. It has been found that this latter solution is of a particular advantage since it decreases the time necessary for the oil to flow from the inlet of the base plate through the hollow space to the surface opening in the conductor of the electric cable. The cylindrical tubing can be made up from a wide range of insulating material. For instance it is possible to use an acrylic resin commonly known under the trademark "PLEXIGLAS" or a suitable hardened epoxy resin.

There has thus been outlined rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings forming a part of the specification, wherein.

Figure 1:
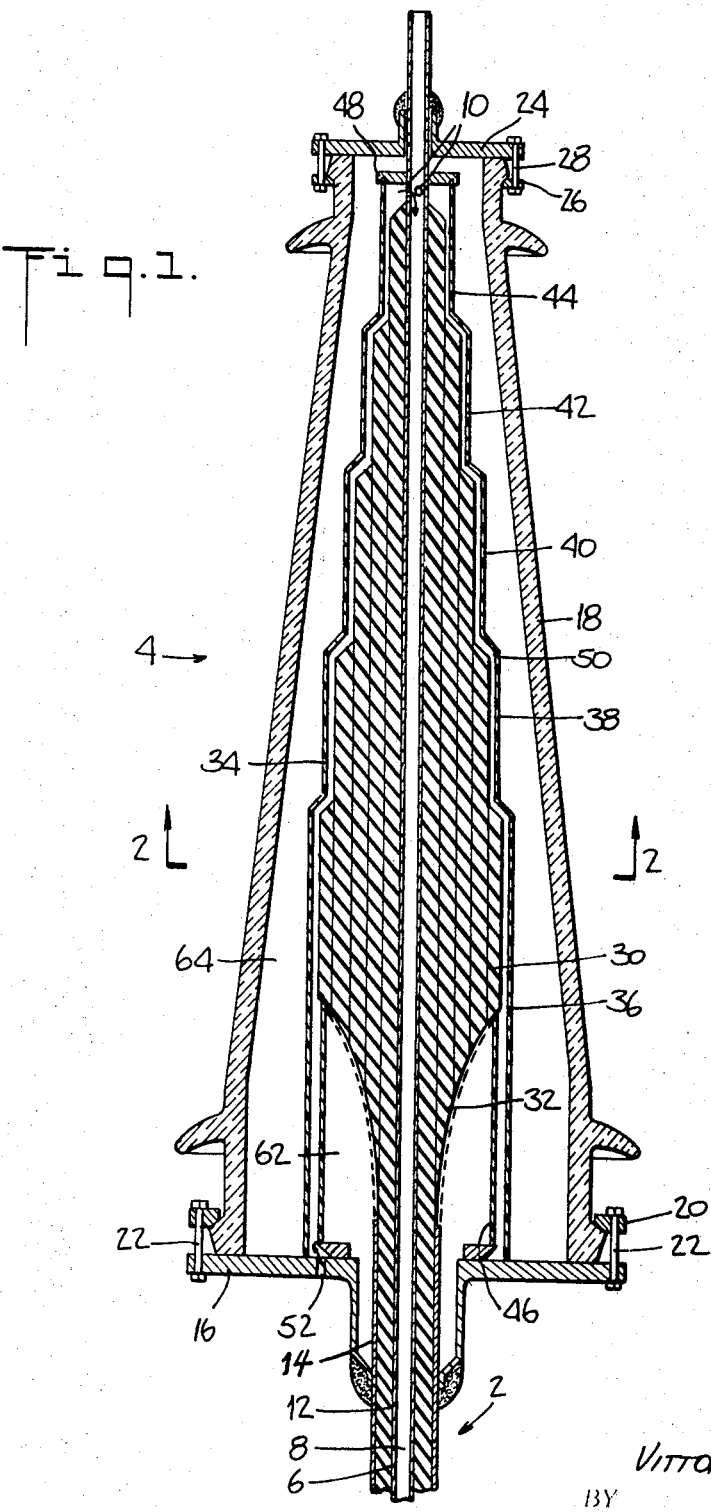
FIG. 1 is a longitudinal sectional view of a sealed end of an electrical cable in accordance with one aspect of the present invention.

Referring now to the drawings in detail and, more particularly, to FIG. 1, there is shown a single core electric cable 2 with its end 4 sealed in accordance with the present invention. The electrical cable 2 includes a conductor 6 having both an oil conduit 8 defined therein and surface openings 10 communicating with the conduit. The electric cable 2 also includes a layer of insulation 12 constituted by paper wrappings as well as an outer sheath 14 of conductive material.

The sealed end 4 of the electric cable 2 is constituted as follows. A metallic base plate 16 is welded to the outer sheath 14 of the electric cable 2 and is constructed to support a porcelain insulator 18. The porcelain insulator 18 is conical shaped substantially as shown in FIG. 1, and has a flange at the base which is clamped between the base plate 16 and a collar ring 20. Bolts 22 serve to hold the plate 16 and ring 20 in clamping position. A second top plate 24 is secured to the conductor 6 near the exposed end of the electric cable 2 and is constructed to secure the other end of the porcelain insulator 18 by means of the collar ring 26 and a plurality of fastening bolts 28. As shown in FIG. 1, the tip of the conductor 6 of the electric cable 2 extends through the second top plate 24.

As shown in FIG. 1, once the end portion 4 of electric cable 2 enters the porcelain insulator 18, it has its outer metallic sheath 14 removed, and in its place has an additional layer of insulating material 30, preferably constituted by paper wrapping.

As shown in FIG. 1, the insulating layer 30 is connected near the base plate 16 to the cable insulation 12 in a well-known manner via a stress cone 32 covered with a conductive screen. The layer of insulating material 30 is reduced in thickness in progressive steps extending from the base plate 16 to the top plate 24. The conductor 6 is, however, completely void of insulating material of any nature in the vicinity near the top plate 24.

Figure 2:
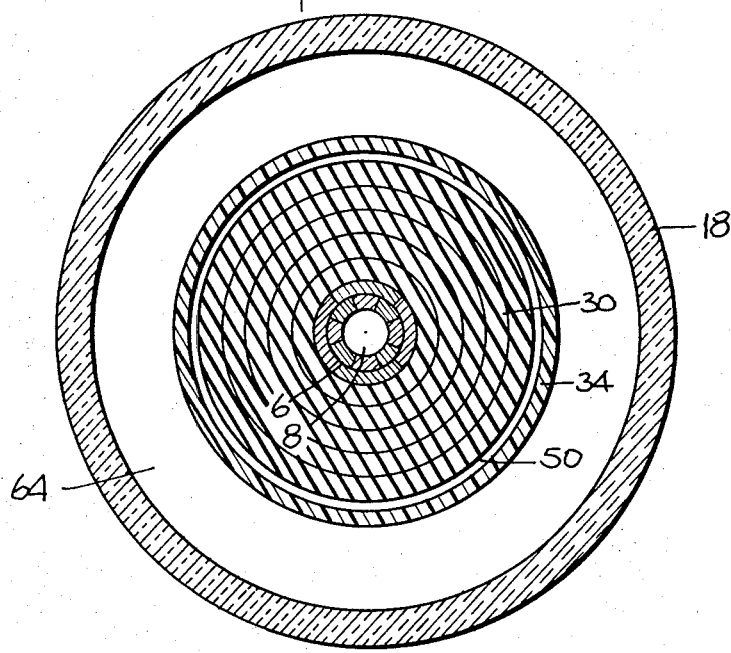
FIG. 2 is a sectional view taken along line 2-2 of FIG. 1.

In accordance with a specific feature of the present invention, a portion of the electrical cable 2 enclosed by the porcelain insulator 18 is surrounded by a smooth and continuous wall (FIG. 2) defined by cylindrical tubing (shown generally at 34 in FIG. 1) and constructed of acrylic resin such as that manufactured under the trademark "PLEXIGLAS" or of epoxy resin which has been suitably hardened. The cylindrical tubing 34 may be constructed from a plurality of cylindrical tube sections 36, 38, 40, 42 and 44 of different diameter and suitably attached to one another. Additionally, a cylindrical wall 46 is provided about the stress cone 32 in the manner shown in FIG. 1. A diaphragm 48 is also provided to cap the cylindrical tube section 44 as shown in FIG. 1. The cylindrical tubing 34 together with the wall 46 and the diaphragm 48 define a hollow space or oil channel 50. As aforesaid, the oil channel 50 is designed to have an average cross-sectional area so that the ratio between the average cross-sectional area of the oil channel 50 and the cross-sectional area of the oil conduit 8 in the conductor 6 is less than 50, and preferably within the range of 10—4.

An opening 52 is provided in the base plate 16 to communicate with the oil channel 50. In operation, oil provided from an oil reservoir of the system (not shown) enters the opening 52 of the base plate 16 and travels longitudinally along the cable 2 in the oil channel 50 and enters the oil conduit 8 through the surface openings 10 in the conductor 6. While the present invention is described with sealed ends in which the cooling oil flows from the end accessories and into the internal oil conduit of the cable, it will be appreciated that the present invention may readily be utilized with other oil circulating systems such as where oil flows from the surface opening or openings 10 through the channel 50 to the opening 52.

Figure 3:
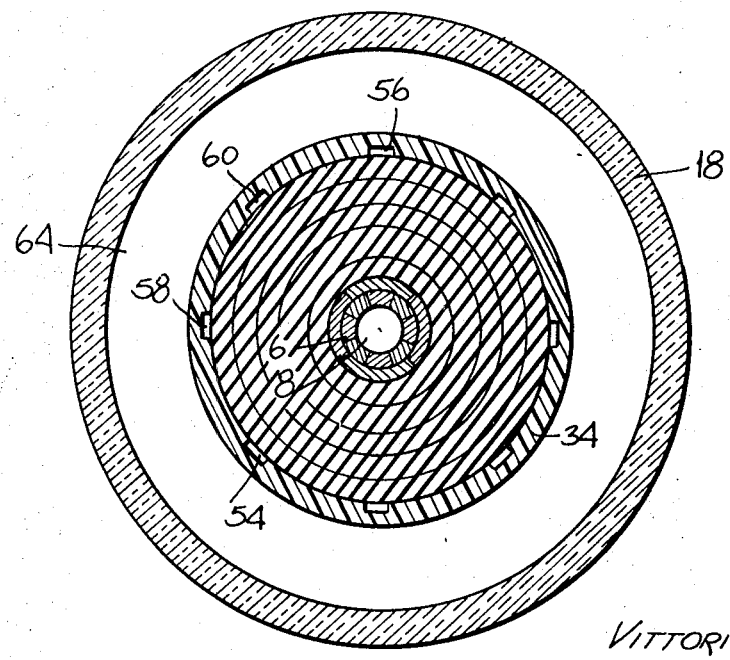
FIG. 3 is a cross-sectional view of a sealed end of an electrical cable in accordance with an alternative embodiment of the present invention.

Alternatively, as shown in FIG. 3, the inner wall provided by cylindrical tubing 34 may further include means defining a plurality of grooves (shown generally at 54 in FIG. 3) and, excepting for these grooves 54, the wall provided by the cylindrical tubing 34 may be in direct contact with the insulating layer 30 of the electric cable 1. Thus, it will be noted that the oil channel 50 in this alternative embodiment is defined by a plurality of independent channels each indicated generally at 56, 58, and 60. This alternative is particularly advantageous since the channels 56, 58 and 60 further decrease the time necessary for the oil to flow from the opening 52 through the oil channel 50 to the opening 10 and into the oil conduit 8.

Returning to FIG. 1, it will be noted that the space 62 defined by the wall 46 and stress cone 32, and the space 64 defined by the porcelain insulator 18 and the cylindrical tubing 34 are still preferably filled with oil as in prior art embodiments. However, this oil, which may come from the oil conduit 8 of the cable 2 by means of a separate channel or from the oil channel 50 through slits provided therein, does not participate in the primary circulation of the circulating oil passing from the opening 52 through the oil channel 50 to the surface openings 10 of the conductor. This circulation should be compared to prior art arrangements described above which do not utilize the separate oil channel 50 and wherein all the oil located within the porcelain insulator 18 participates in the cooling oil circulation.

Having thus described the invention with particular reference to the preferred form thereof, it will be obvious to those skilled in the art to which the invention pertains, after understanding the invention, that various changes and modifi-

I claim:

1. A sealed electric cable end comprising the end portion of an electric cable which comprises a conductor having an oil conduit therein and an oil passageway therein extending from said conduit to the exterior of said conductor and a layer of insulation surrounding said conductor except in the vicinity of said opening and except at a portion thereof adjacent the extreme end thereof; an outer hollow insulator surrounding said end portion with its interior wall spaced from said insulation, first means providing a fluid-tight seal between one end portion of said insulator and said insulation at one side of said oil passageway and at a portion of said insulation spaced from said oil passageway, second means providing a fluid-tight seal between the opposite end portion of said insulator and said conductor at the opposite side of said oil passageway, and a tubular sleeve of substantially oil impermeable insulating material disposed intermediate said interior wall of said insulator and said layer of insulation for dividing the space between said interior wall and said insulation into a substantially fluid-tight chamber between said sleeve and said wall and an oil channel between said sleeve and said insulation, and sleeve having, at one end thereof, a substantially fluid-tight connection with said conductor at said opposite side of said oil passageway and having, at the other end thereof, a substantially fluid-tight connection with said layer of insulation at a portion thereof at said one side of said oil passageway and spaced from the latter, said sleeve having at least a portion of the exterior wall thereof spaced from said interior wall of said insulator to provide said substantially fluid-tight oil chamber between said exterior wall of said sleeve and said interior wall of said insulator and having at least a portion of the interior wall thereof spaced from said layer of insulation to provide said oil channel intermediate said interior wall of said sleeve and said insulation and which communicates with said oil passageway, said cable end having an oil passageway therein extending from exteriorly thereof to said other end of said sleeve and to said oil channel for supplying oil to, and removing oil from, said channel.

2. A cable end as set forth in claim 1 wherein said first means comprises a base plate secured to said cable and to said one end of said insulator and said sleeve is secured thereto at said other end thereof, said plate having an aperture therein extending from exteriorly thereof to within said sleeve and forming said oil passageway in said cable end, said second means comprises a top plate secured to said conductor and to said opposite end of said insulator and said fluid-tight connection between said one end of said sleeve and said conductor comprises a further plate connected to said conductor intermediate said oil passageway and said top plate and to said one end of said sleeve.

3. A cable end as set forth in claim 1 wherein said sleeve comprises cylindrical tubing of decreasing diameter and which extends from said base plate to said oil passageway in said conductor.

4. A cable end as set forth in claim 1 wherein said sleeve has a plurality of grooves in the interior wall thereof which extend longitudinally of said sleeve, the portions of the interior wall between said grooves being in contact with said insulation.

5. A cable end as set forth in claim 1 wherein said sleeve is constructed of acrylic resin.

6. A cable end as set forth in claim 1 wherein said sleeve is constructed of hardened epoxy resin.

7. A sealed end of an electric cable comprising an end portion of said electrical cable including a conductor with an oil conduit defined therein and with a surface opening communicating with said conduit, a layer of insulating material surrounding said conductor except in the vicinity of said opening and except in the vicinity of the extreme end portion of said cable, first means located in said end portion for providing an opening to an oil reservoir, second means surrounding a part of said end portion including said insulating layer for defining an oil channel which communicates with said surface opening and said first means, said second means being constructed of an insulating material which is impermeable to oil, and outer insulator means surrounding said end portion including said second means, the ratio between the average cross-sectional area of said oil channel and the cross-sectional area of said conduit in the conductor being less than 50.

8. A cable end as set forth in claim 7 wherein said ratio is between 4 and 10.

9. A method of sealing and cooling an electrical cable having a conductor with an oil conduit defined therein, said method comprising forming a surface opening on said conductor which communicates with said oil conduit, building up a layer of insulating material about said conductor except in the vicinity of said surface opening, attaching to said cable first means having an opening therethrough, surrounding said cable including the insulating layer and said surface opening with a sleeve having a wall impervious to oil with at least a portion of the interior of said wall spaced from said insulation, sealing said sleeve to said conductor adjacent said surface opening and to said first means with the opening therethrough within said sleeve, placing an outer insulator having an inner periphery greater than the outer periphery of said sleeve around said sleeve, and circulating oil between said sleeve and said insulation by way of said openings to cool the cable portion within said sleeve.

10. Means for sealing electrical cables having a conductor with an oil conduit defined therein and with a surface opening adjacent the end thereof communicating with said conduit and having a layer of insulation therearound except at said opening and said end, said means comprising a first base plate adapted to be secured to said cable at a portion thereof spaced from said end thereof more remotely than said opening, a sleeve of insulating material for surrounding said insulation and having an interior wall at least portions of which are larger in diameter than the diameter of said insulation; means for providing fluid-tight seals between said sleeve and said conductor and said base plate, said base plate having an opening therethrough extending within said sleeve, an outer insulator having an internal diameter greater than the external diameter of said sleeve; means for providing a fluid-tight seal between said insulator and said base plate and means for providing a fluid-tight seal between said insulator and said conductor.

11. Means as set forth in claim 10 wherein the ratio between the average cross-sectional area of the space between the interior wall of said sleeve and said insulation and the cross-sectional area of said conduit in the conductor is less than 50.

12. Means as set forth in claim 11 wherein said ratio is between 4—10.

13. Means as set forth in claim 10 wherein said sleeve comprises coaxial sections of cylindrical tubing of decreasing diameter.

14. Means as set forth in claim 10 wherein said sleeve has a plurality of grooves in the interior wall thereof which extend longitudinally thereof.

15. An article of the class described for providing an oil channel for cooling electrical cables having a conductor with an oil conduit defined therein and with a surface opening communicating with said conduit, said article comprising cylindrical tubing of decreasing diameter constructed to define an oil channel between said surface opening in said conductor and an oil reservoir, said tubing being constructed of an insulating material which is impermeable to oil and the ratio between the average cross-sectional area of the oil channel defined by said tubing and the cross-sectional area of the oil conduit of the conductor in which it is utilized is less than 50.

16. An article of the class described as set forth in claim 15 wherein said ratio is between 4—10.

17. An article of the class described as in claim 15 wherein said cylindrical tubing provides a smooth interior wall to define said oil channel.

18. An article of the class described as in claim 15 wherein said cylindrical tubing has a plurality of grooves in the interior wall thereof and extending along the longitudinal length of said tubing for defining said oil channel.